(12) United States Patent
Park

(10) Patent No.: US 12,493,968 B2
(45) Date of Patent: Dec. 9, 2025

(54) INTELLIGENT IMAGE ANALYSIS SYSTEM FOR ANALYZING OBJECT BY INTELLIGENTLY PROCESSING CAMERA IMAGES

(71) Applicant: EdgeDX Co., Ltd., Seoul (KR)

(72) Inventor: Dong Uk Park, Seoul (KR)

(73) Assignee: EdgeDX Co., Ltd., Seoul (KR)

( * ) Notice: Subject to any disclaimer, the term of this patent is extended or adjusted under 35 U.S.C. 154(b) by 288 days.

(21) Appl. No.: 18/239,136

(22) Filed: Aug. 29, 2023

(65) Prior Publication Data

US 2024/0070879 A1    Feb. 29, 2024

(30) Foreign Application Priority Data

Aug. 30, 2022  (KR) .......................... 10-2022-0109312

(51) Int. Cl.
| | |
|---|---|
| *G06T 7/246* | (2017.01) |
| *G06T 7/292* | (2017.01) |
| *G06T 7/579* | (2017.01) |
| *G06V 20/52* | (2022.01) |
| *H04W 64/00* | (2009.01) |

(52) U.S. Cl.
CPC .............. *G06T 7/248* (2017.01); *G06T 7/292* (2017.01); *G06T 7/579* (2017.01); *G06V 20/52* (2022.01); *H04W 64/006* (2013.01)

(58) Field of Classification Search
None
See application file for complete search history.

(56) References Cited

U.S. PATENT DOCUMENTS

| | | | |
|---|---|---|---|
| 9,740,941 B2 | 8/2017 | Bae et al. | |
| 12,379,908 B2 * | 8/2025 | Gass | ........................ G06F 8/751 |

(Continued)

FOREIGN PATENT DOCUMENTS

| | | | | |
|---|---|---|---|---|
| KR | 10-2014-0126167 A | | 10/2014 | |
| KR | 20160003997 A | * | 1/2016 | ............. G06V 20/52 |

(Continued)

OTHER PUBLICATIONS

Korean Office Action mailed on Apr. 8, 2025 from Korean Patent Office for Application No. 10-2022-0109312.

*Primary Examiner* — Delomia L Gilliard
(74) *Attorney, Agent, or Firm* — Insight Law Group, PLLC; Seung Lee

(57) ABSTRACT

Provided is an intelligent image analysis system metaverse system for analyzing an object by intelligently processing camera images of a plurality of spatial zones in each of which at least one camera is installed. The intelligent image analysis system includes body shape encoders configured to detect an object in a camera image of each spatial zone and encode the object into a shape identifier (ID) on the basis of features of a body shape, a spatial-zone-specific identification manager configured to manage the shape ID together with camera information and time information, an identical shape ID extractor configured to extract identical shape IDs from different spatial zones on the basis of a list of shape IDs which are encoded according to each spatial zone, and an identical object determiner configured to determine a shape ID related to the same object using a distance between two spatial zones and imaging time information.

10 Claims, 13 Drawing Sheets

(56) References Cited

U.S. PATENT DOCUMENTS

| | | | | |
|---|---|---|---|---|
| 2012/0189162 A1* | 7/2012 | Sawada | ................... | G01C 3/08 |
| | | | | 382/103 |
| 2014/0347475 A1* | 11/2014 | Divakaran | ............. | G06V 20/52 |
| | | | | 348/135 |
| 2018/0189573 A1* | 7/2018 | Divakaran | ............. | G06V 20/52 |
| 2018/0204076 A1* | 7/2018 | Tripathi | ................ | G06V 20/58 |

FOREIGN PATENT DOCUMENTS

| | | | | | |
|---|---|---|---|---|---|
| KR | 10-2016-0049391 | A | | 5/2016 | |
| KR | 10-1657450 | B1 | | 9/2016 | |
| KR | 10-2021-0066540 | A | | 6/2021 | |
| KR | 20210116953 | A | * | 9/2021 | ............ G06V 20/20 |
| KR | 10-2374776 | B1 | | 3/2022 | |
| KR | 10-2421705 | B1 | | 7/2022 | |
| KR | 10-2022-0114819 | A | | 8/2022 | |

\* cited by examiner

FIG.4 A

| | CAMERA NO | IMAGING TIME | SHAPE ID | X COORDINATE OF OBJECT | Y COORDINATE OF OBJECT |
|---|---|---|---|---|---|
| 410 | A-01 | 14:01 | 111 | 100 | 200 |
| 420 | A-01 | 14:02 | 111 | 500 | 400 |
| 423 | A-01 | 14:02 | 112 | 300 | 700 |
| 430 | A-01 | 14:03 | 111 | 900 | 600 |
| 433 | A-01 | 14:03 | 112 | 300 | 500 |

FIG.4 B

| | CAMERA NO | IMAGING TIME | SHAPE ID | X COORDINATE OF OBJECT | Y COORDINATE OF OBJECT |
|---|---|---|---|---|---|
| 447 | A-02 | 14:05 | 111 | 900 | 400 |
| 450 | B-02 | 14:05 | 111 | 100 | 200 |
| 467 | C-01 | 14:02 | 111 | 900 | 700 |

FIG.5

| | SHAPE ID | IMAGING TIME | CAMERA NO | X COORDINATE OF CAMERA | Y COORDINATE OF CAMERA | X COORDINATE OF OBJECT | Y COORDINATE OF OBJECT | WIDE ZONE | WIRELESS ID |
|---|---|---|---|---|---|---|---|---|---|
| 510 | 111 | 14:01 | A-01 | 0 | 0 | 100 | 200 | A | H01A |
| 520 | 111 | 14:02 | A-01 | 0 | 0 | 500 | 400 | A | H01A P02B |
| 527 | 111 | 14:02 | C-01 | 600 | 2000 | 900 | 700 | C | S01C |
| 530 | 111 | 14:03 | A-01 | 0 | 0 | 900 | 600 | A | H01A P02B |
| 547 | 111 | 14:05 | A-02 | 0 | 1000 | 900 | 400 | A | X02A |
| 550 | 111 | 14:05 | B-02 | 1100 | 1000 | 100 | 200 | B | H01A |

INTELLIGENT IMAGE ANALYSIS SYSTEM FOR ANALYZING OBJECT BY INTELLIGENTLY PROCESSING CAMERA IMAGES

CROSS-REFERENCE TO RELATED APPLICATION(S)

This application claims priority from Korean Patent Application No. 10-2022-0109312, filed on Aug. 30, 2022, in the Korean Intellectual Property Office, the disclosure of which is incorporated herein by reference in its entirety.

BACKGROUND

1. Field

The following description relates to a data processing system for recognizing an object on the basis of features of a body shape, and more particularly, to a system for encoding an object detected in a camera image into a shape identifier (ID) on the basis of features of the body shape and determining whether identical shape IDs correspond to the same object using spatial distance and imaging time information.

2. Description of Related Art

Security cameras, such as closed-circuit televisions (CCTVs), are being used to analyze the causes of various accidents that occur in the increasingly complex society, prevent crimes, and record and confirm daily human activities. As the installation of security cameras increases, negative aspects, such as invasion of privacy, are highlighted, but the supply of security cameras is gradually increasing with an expansion of the demand for safety in overall society.

Due to the recent development of information technology (IT) including wired and wireless communication technology and Internet of things (IoT) technology, it has become possible to control security cameras using the Internet, and a large number of security cameras can be controlled through a network. In a system employing a plurality of security cameras, an object moving between security cameras may be monitored, and the monitoring data may be used in route analysis and the like. This requires a re-identification (Re-ID) technology for a camera to recognize an object which has been identified or recognized by another camera as the same object.

Among Re-ID technologies, a Re-ID technology employing features of a body has advantages in terms of privacy protection and thus is actively being researched. However, due to an external environment, that is, the weather, lighting, an imaging angle, covering by another object, and the like, an object may be reidentified as another object, or a different object may be incorrectly reidentified as the same object. Lately, research has been under way to increase a recognition rate by applying deep learning technology to such Re-ID technologies.

Korean Patent No. 10-2374776 published on Mar. 17, 2022, discloses a system and method for reidentifying a target object based on location information of CCTVs and movement information of the object. The method of reidentifying a target object includes an operation of receiving a plurality of original videos from a plurality of CCTVs, an operation of detecting at least one object of interest in the plurality of videos, an operation of tracking the object of interest in a corresponding video and generating a tube of the object of interest, an operation of receiving an image query about a target object, an operation of determining a candidate search area on the basis of CCTV location information and movement information of the target object, an operation of reidentifying whether the object of interest in the candidate search area is the target object, and an operation of providing the tube of the reidentified object of interest to a user.

Korean Patent No. 10-2421705 published on Jul. 18, 2022, discloses an information analysis system and method for reidentifying an object. The information analysis system includes a data processing part. The data processing part acquires a first image from a first passage information acquisition device and recognizes an object of interest, predicts a movement direction of the object of interest, selects a second passage information acquisition device corresponding to the movement direction using the predicted movement direction and location information of passage information acquisition devices, and requests reidentification from the second passage information acquisition device.

Korean Patent Application No. 10-2014-0126167 published on Oct. 30, 2014, discloses an apparatus and method for providing a tracking video. The method of providing a tracking video includes an operation of receiving location information from CCTV cameras and checking imaging areas of the CCTV cameras, an operation of receiving location information of a mobile terminal to be tracked and comparing the location information of the mobile terminal with the imaging areas to determine an imaging area to which the mobile terminal belongs, and an operation of transmitting a captured image of a CCTV camera corresponding to the imaging area to a control server.

Korean Patent No. 10-1521111 published on May 19, 2015, discloses a system and method for tracing a location on the basis of radio frequency (RF) recognition and camera images. The system for tracing a location includes a wireless terminal which is worn by a target of location tracing to generate a wireless signal from information thereon, a plurality of wireless detectors which are installed in a location tracing space to recognize and transmit the information on the wireless terminal to a network, a plurality of CCTV cameras which image the target of location tracing and transmit captured images to the network, and a location tracing device which determines a transportation means of the target of location tracing using location information of the wireless detectors and traces the location of the target of location tracing passing through an area in which no wireless detector is installed using the images captured by the plurality of CCTV cameras.

However, Re-ID technologies according to the related art have sequential operations of predicting a movement direction of an object of interest in a CCTV video, selecting a candidate area, and reidentifying the object of interest in the selected area. In addition, no method of reidentifying or re-recognizing an object of interest using wireless terminal information has been disclosed.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to providing an intelligent image analysis system for rapidly re-recognizing an object of interest from a plurality of camera images.

The following description also relates to providing an intelligent image analysis system for accurately tracing a travel route of an object of interest.

Technical objects to be achieved in the present invention are not limited to those described above, and other technical objects that have not been described will be clearly understood by those of ordinary skill in the art from the following description.

In one general aspect, an intelligent image analysis system analyzes an object by intelligently processing camera images of a plurality of spatial zones in each of which at least one camera is installed. The intelligent image analysis system includes a spatial-zone-specific image analysis part and an integrated shape identifier (ID) management part. The spatial-zone-specific image analysis part includes body shape encoders and a spatial-zone-specific identification manager. The integrated shape ID management part includes an identical shape ID extractor and an identical object determiner.

The body shape encoders detect an object in a camera image of each spatial zone and encode the object into a shape ID on the basis of features of a body shape. The spatial-zone-specific identification manager manages the shape ID together with camera information and time information.

The identical shape ID extractor extracts identical shape IDs from different spatial zones on the basis of a list of shape IDs which are collected from each of the spatial-zone-specific body shape encoders and encoded according to each spatial zone. The identical object determiner determines a shape ID related to the same object using a distance between two spatial zones and imaging time information.

The identical object determiner may include a movement state determiner configured to determine a movement speed and direction of the object using coordinates of the object having the same shape ID in the same spatial zone.

The identical object determiner may further include a boundary deviation determiner configured to determine whether the object deviates from a boundary of a spatial zone of a current camera using the movement direction and speed of the object.

The identical object determiner may include a transportation means checker configured to check nearby transportation means when the object is not detected in a spatial zone of a current camera.

The intelligent image analysis system may further include a wireless communication device information collector and a wireless communication device identification part. The wireless communication device information collector may collect ID information of a wireless communication device carried by the object. The wireless communication device identification part may determine a spatial zone in which a wireless communication device ID identical to the ID information is present.

The intelligent image analysis system may further include a wide-area camera information manager. The wide-area camera information manager manages information on each spatial zone in a wide zone including a plurality of spatial zones and camera ID information of each spatial zone.

The wide zone may correspond to a cell area in which a base station of a mobile communication network communicates with a terminal, and the wireless communication device may be a mobile communication terminal which communicates with the base station of the wide zone.

Each of the body shape encoders may include an imaging direction classifier and a plurality of direction-specific shape encoders. The imaging direction classifier detects the object in a captured image and classifies the object according to imaging directions. The direction-specific shape encoders determine shape IDs for the object according to the imaging directions.

The integrated ID management part may further include a direction-specific shape ID classifier. The direction-specific shape ID classifier classifies, as identical shape IDs, shape IDs of objects detected at the same location in direction-specific images captured at the same time point.

The intelligent image analysis system may further include a travel route information generator. The travel route information generator generates travel route information of the object using time-series location information of the shape ID related to the same object.

Other features and aspects will be apparent from the following detailed description, the drawings, and the claims.

BRIEF DESCRIPTION OF THE DRAWINGS

FIGS. 4A and 4B are a set of tables illustrating operations of a spatial-zone-specific image analysis part of the intelligent image analysis system according to the exemplary embodiment of the present invention.

FIG. 5 is a table illustrating operations of an integrated shape identifier (ID) management part of the intelligent image analysis system according to the exemplary embodiment of the present invention.

Figure 1A:
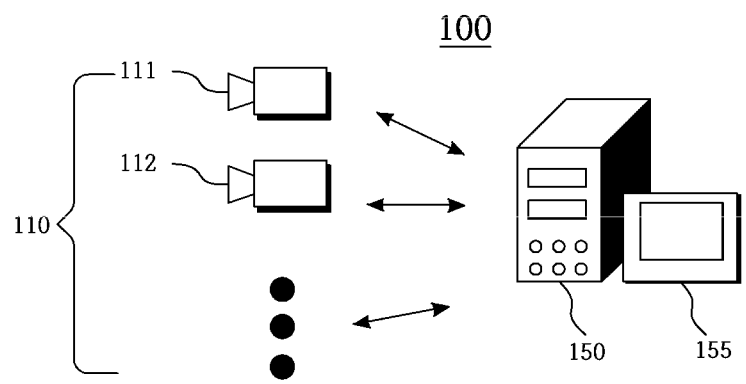
FIGS. 1A and 1B are conceptual diagrams illustrating an overall configuration of an intelligent image analysis system for analyzing an object by intelligently processing camera images according to an exemplary embodiment of the present invention.

Throughout the accompanying drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The above-described and additional aspects will be specified through exemplary embodiments described with reference to the accompanying drawings. It will be understood that elements of each of the embodiments may be combined in various ways within the embodiment or combined with elements of other embodiments in various ways unless otherwise stated or contradicted in the context. On the basis of the principle that the inventor can appropriately define concepts of terms for describing his or her invention in the best way, terms used herein and in the claims should be interpreted as having the meanings and concepts which are consistent with the description or the proposed technical spirit. In this specification, the term "module" or "part" may refer to a set of program commands stored in a memory to be executable by a computer or processor or may be implemented using an electronic part, such as an application-specific integrated circuit (ASIC), a field programmable gate array (FPGA), or the like, or a set of circuits. Also, operations of each module or part may be performed by one or more processors or devices.

Hereinafter, the exemplary embodiments of the present invention will be described in detail with reference to the accompanying drawings.

FIG. 1 is a conceptual diagram illustrating an overall configuration of an intelligent image analysis system for analyzing an object by intelligently processing camera images according to an exemplary embodiment of the present invention.

Referring to FIG. 1A, an intelligent image analysis system 100 according to the exemplary embodiment includes a plurality of cameras 110 (111, 112, 113, . . . ) and an image analysis server 150. The plurality of cameras 110 are connected to the image analysis server 150 through a wired or wireless communication network. The image analysis server 150 may control a camera so that an imaging area may be imaged by the camera. An image captured by the camera may be transmitted to and stored in the image analysis server 150, and the image analysis server 150 may extract objects from the received image and classify the objects by encoding the objects into shape IDs. The image captured by the camera may be displayed through an output device 155.

Figure 1B:
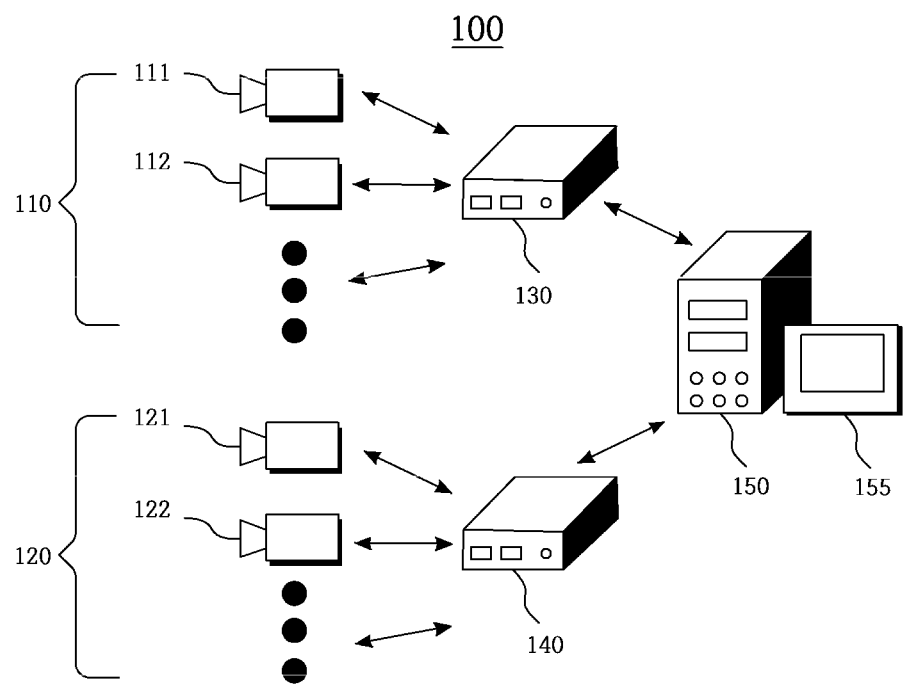

Referring to FIG. 1B, an intelligent image analysis system 100 according to a modification of the exemplary embodiment further includes an edge box that may control a plurality of cameras and perform deep learning image analysis. A first edge box 130 is connected to a first group of cameras 110 (111, 112, 113, . . . ) in a wired or wireless manner. The first edge box 130 controls motion of the first group of cameras 110, extracts objects from images captured by the first group of cameras 110, encodes the objects into shape IDs, and transmits the shape IDs to an image analysis server 150. A second edge box 140 is connected to a second group of cameras 120 (121, 122, 123, . . . ) in a wired or wireless manner. The second edge box 140 controls motion of the second group of cameras 120, extracts objects from images captured by the second group of cameras 120, encodes the objects into shape IDs, and transmits the shape IDs to the image analysis server 150.

Each camera obtains an image by imaging a spatial zone which is an imaging range. The spatial zone of each camera may be independent of or partially or entirely overlap the spatial zones of other cameras. Cameras may be installed so that spatial zones imaged by the cameras partially overlap. However, some zones may be excluded from the imaging ranges of cameras due to the problems of cost and management. For example, a plurality of cameras may mainly be installed at intersections, entrances and exits of buildings and large stores, and the like in urban areas, and some sections may not be within the imaging ranges of the cameras.

Figure 2:
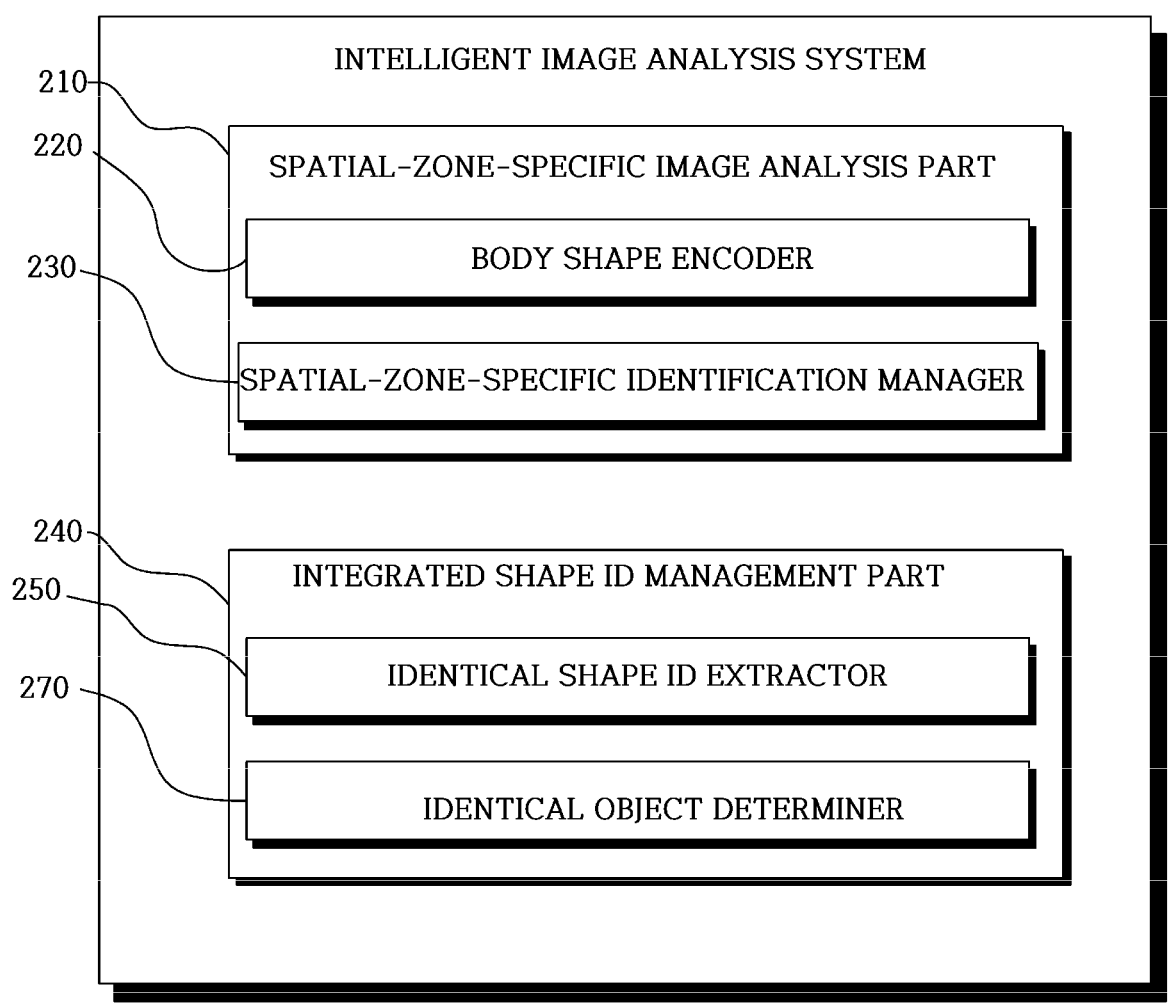
FIG. 2 is a detailed block diagram of the intelligent image analysis system for analyzing an object by intelligently processing camera images according to an exemplary embodiment of the present invention.

FIG. 2 is a detailed block diagram of the intelligent image analysis system for analyzing an object by intelligently processing camera images according to the exemplary embodiment of the present invention.

According to an aspect of the proposed invention, an intelligent image analysis system 200 analyzes objects in a plurality of spatial zones in each of which at least one camera is installed, by intelligently processing camera images. The intelligent image analysis system 200 includes a spatial-zone-specific image analysis part 210 and an integrated shape identifier (ID) management part 240. The spatial-zone-specific image analysis part 210 includes a body shape encoder 220 and a spatial-zone-specific identification manager 230. The integrated shape ID management part 240 includes an identical shape ID extractor 250 and an identical object determiner 270.

The body shape encoder 220 detects objects in a camera image of each spatial zone and encodes the objects into shape IDs on the basis of features of body shapes. The spatial-zone-specific identification manager 230 manages the shape IDs together with camera information and time information.

The identical shape ID extractor 250 extracts identical shape IDs from different spatial zones on the basis of a list of shape IDs which are collected from each spatial-zone-specific body shape encoder and encoded according to each spatial zone. The identical object determiner 270 determines a shape ID related to the same object using the distance between two spatial zones and imaging time information.

The spatial-zone-specific image analysis part 210 and the integrated shape ID management part 240 may be configured in a camera 111, an edge box 130, or an image analysis server 150. For example, operations of the spatial-zone-specific image analysis part 210 and the integrated shape ID management part 240 may be performed by one processor which constitutes the edge box 130 or the image analysis server 150. Also, operations of the spatial-zone-specific image analysis part 210 may be handled by a processor which constitutes the camera 111 or the edge box 130, and operations of the integrated shape ID management part 240 may be handled by a processor which constitutes the image analysis server 150. In other words, the spatial-zone-specific image analysis part 210 and the integrated shape ID management part 240 may include at least one processor and a memory storing program commands which are executable by the processor.

The processor detects objects in a camera image of each spatial zone, encodes the objects into shape IDs on the basis of features of body shapes, and manages the shape IDs together with camera information and time information. The processor may extract identical shape IDs from different spatial zones on the basis of a list of shape IDs which are collected from each spatial-zone-specific body shape encoder and encoded according to each spatial zone, and determine a shape ID related to the same object using distance between two spatial zones and imaging time information.

Operations of the intelligent image analysis system 200 according to an exemplary embodiment will be described with reference to FIGS. 3 to 5.

Figure 3:
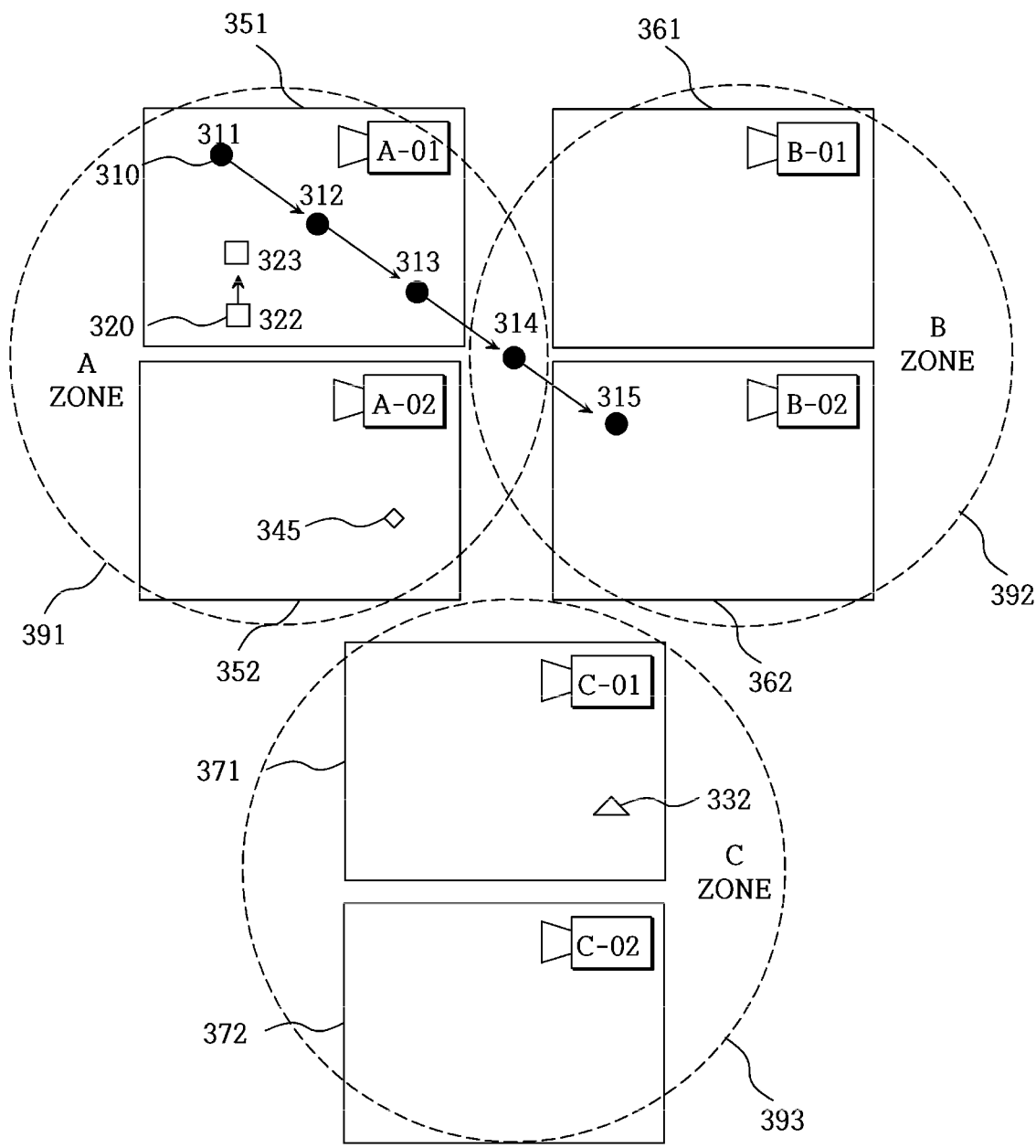
FIG. 3 is a conceptual diagram of a plurality of spatial zones in each of which at least one camera is installed, illustrating operations of the intelligent image analysis system according to the exemplary embodiment of the present invention.

FIG. 3 is a conceptual diagram of a plurality of spatial zones in each of which at least one camera is installed, illustrating operations of the intelligent image analysis system according to the exemplary embodiment of the present invention.

In FIG. 3, six cameras A-01, A-02, B-01, B-02, C-01, and C-02 are schematically shown. Spatial zones 351, 352, 361, 362, 371, and 372 imaged by the cameras are indicated by solid lines in quadrangular shapes. An object of interest 310 is indicated by a circular point and moves in an arrow direction. For example, the object of interest 310 moves from a location 311 at 14:01 to a location 312 at 14:02 and a location 313 at 14:03 in the upper left spatial zone 351 of the camera A-01, passes a location 314 without a camera at 14:03, and moves to a location 315 at 14:05 in the lower right spatial zone 362 imaged by the camera B-02.

In the spatial zone 351 of the camera A-01, an object 320 different from the object of interest 310 is shown as a quadrangle. The object 320 appears at a location 322 at 14:02 and moves to a location 323 at 14:03.

Referring to FIG. 3, another object 332 shown as a triangle appears in the spatial zone 371 of the camera C-01 at 14:02. Another object 345 shown as a diamond is imaged in the spatial zone 352 of the camera A-02 at 14:05.

Referring to FIG. 3, wide zones which are larger than the spatial zone of each camera are indicated by broken lines. Among the wide zones, A zone 391 includes the spatial zone 351 of the camera A-01 and the spatial zone 352 of the camera A-02. Among the wide zones, B zone 392 includes the spatial zone 361 of the camera B-01 and the spatial zone 362 of the camera B-02. Among the wide zones, C zone 393 includes the spatial zone 371 of the camera C-01 and the spatial zone 372 of the camera C-02. Like spatial zones, wide zones may at least partially overlap each other.

A wide zone may be implemented by an antenna or base station that transmits and receives wireless communication signals to and from spatial zones corresponding to the inside thereof.

FIG. 4 is a set of tables illustrating operations of a spatial-zone-specific image analysis part of the intelligent image analysis system according to the exemplary embodiment of the present invention.

Each camera transmits a captured image of its spatial zone to the spatial-zone-specific image analysis part 210. The spatial-zone-specific image analysis part 210 may extract images at certain time intervals and analyze the images.

The body shape encoder 220 of the spatial-zone-specific image analysis part 210 detects an object in each camera image and encodes the object into a shape ID. Together with camera information and time information, the spatial-zone-specific identification manager 230 of the spatial-zone-specific image analysis part 210 stores and manages the shape ID of the object which is encoded by the body shape encoder 220 and extracted from the camera image.

In the form of a list, FIG. 4A shows examples of shape ID information managed by the spatial-zone-specific identification management part for a spatial zone imaged by the camera A-01. The shape ID information is stored and managed together with camera information (camera Nos.) and time information (imaging times). A location (an X coordinate and a Y coordinate) of a detected object in an imaged spatial zone may be added to the shape ID information. The object of interest 310 shown as a circular point in FIG. 3 is encoded into the shape ID "111," and the object 320 shown as a quadrangle is encoded into the shape ID "112."

Referring to a first row 410 of FIG. 4A, an object is detected in an image captured by the camera A-01 at 14:01, and the shape ID "111" is set for the detected object of interest 310 as a result of shape encoding of the detected object.

Referring to a second row 420 and a fourth row 430 of FIG. 4A, the same shape ID "111" may be obtained by performing shape encoding on the object of interest 310 in the images captured by the camera A-01 at 14:02 and 14:03. Here, an X coordinate and a Y coordinate change according to movement of the object of interest 310.

Referring to a third row 423 and a fifth row 433 of FIG. 4A, when the new object 320 different from the object of interest 310 is imaged in the imaging area of the camera A-01, a shape ID different from the shape ID of the object of interest 310 is assigned to the new object 320. In other words, the new object 320 is encoded into "112" which is different from the encoding value of the object of interest 310.

FIG. 4B shows examples of shape ID information of objects imaged by several cameras. Referring to a first row 447 of FIG. 4B, the object 345 other than the object of interest 310 is detected in an image of the spatial zone 352 captured by the camera A-02 at 14:05, and the object 345 is encoded into the same shape ID "111" as the object of interest 310 as a result of shape encoding of the detected object.

Referring to a second row 450 of FIG. 4B, the object of interest 310 is detected in an image of the spatial zone 362 captured by the camera B-02 at 14:05, and the same object of interest 310 is encoded into the same shape ID "111" as encoded by the camera A-01 as a result of shape encoding of the detected object.

Referring to a third row 467 of FIG. 4B, the object 332 other than the object of interest 310 is detected in an image of the spatial zone 371 captured by the camera C-01 at 14:02, and the object 332 is encoded into the same shape ID "111" as the object of interest 310 as a result of shape encoding of the detected object.

FIG. 5 is a table illustrating operations of an integrated shape ID management part of the intelligent image analysis system according to the exemplary embodiment of the present invention.

The identical shape ID extractor 250 of the integrated shape ID management part 240 extracts identical shape IDs from different spatial zones on the basis of a list of shape IDs which are collected from each spatial-zone-specific body shape encoder and encoded according to each spatial zone.

FIG. 5 shows examples of data obtained by extracting the same shape ID "111." Data about the same shape ID may be arranged in order of imaging time and shown.

As shown in FIG. 4, data for determining the same object may be generated by collecting only cases in which a shape ID is "111" from a plurality of lists of shape IDs encoded according to each spatial zone.

Referring to FIG. 5, the data obtained by extracting the same shape ID to determine the same object may include shape IDs, imaging times, camera information (camera Nos., camera locations, and the like), object coordinates, and the like. The camera locations may be represented as the coordinates of origins in spatial zones imaged by cameras. The data obtained by extracting the same shape ID to determine the same object may further include wide zones, wireless IDs of wireless communication devices carried by objects, and the like.

A first row 510, a second row 520, and a fourth row 530 of FIG. 5 represent the object of interest 310 imaged by the camera A-01 at 14:01, 14:02, and 14:03, respectively. A sixth row 550 represents the object of interest 310 imaged by the camera B-02 at 14:05.

A third row 527 represents an object other than the object of interest 310 imaged by the camera C-01 at 14:02, and a fifth row 547 represents another object imaged by the camera A-02 at 14:05. These are not the object of interest 310 but are encoded into the same shape ID "111" as the object of interest 310.

The identical object determiner 270 of the integrated shape ID management part 240 determines a shape ID related to the same object using the distance between two spatial zones and imaging time information.

Referring to the first row of FIG. 5, the object of interest 310 with the shape ID "111" is in the spatial zone of the camera A-01 at 14:01. An object encoded into the same shape ID at 14:02 which is an imaging time is checked in the spatial zone 351 of the camera A-01 corresponding to the second row 520 and the spatial zone 371 of the camera C-01 corresponding to the third row 527. However, the spatial zone of the camera C-01 is not adjacent to the spatial zone of the camera A-01, and the origins of camera coordinates are (600, 2000) away from each other. Accordingly, the two objects may be determined not to be identical objects on the basis of the distance between the two spatial zones and the imaging time information. Therefore, the shape IDs of the first row 510 and the second row 520 detected in the spatial zone 351 of the camera A-01 may be determined to be the same object, and the shape ID of the third row 527 may be determined to be another object.

Configurations of intelligent image analysis systems according to various modifications of the embodiment will be described with reference to FIGS. 6 to 9. Elements used for modifying the illustrated embodiment may be individually added to the embodiment, or a plurality of elements may be added to the embodiment all together. To avoid repetition, elements of the above-described embodiment will not be described. For an element of which description is omitted, reference may be made to the above description of elements having similar rear digits of reference numerals.

Figure 6:
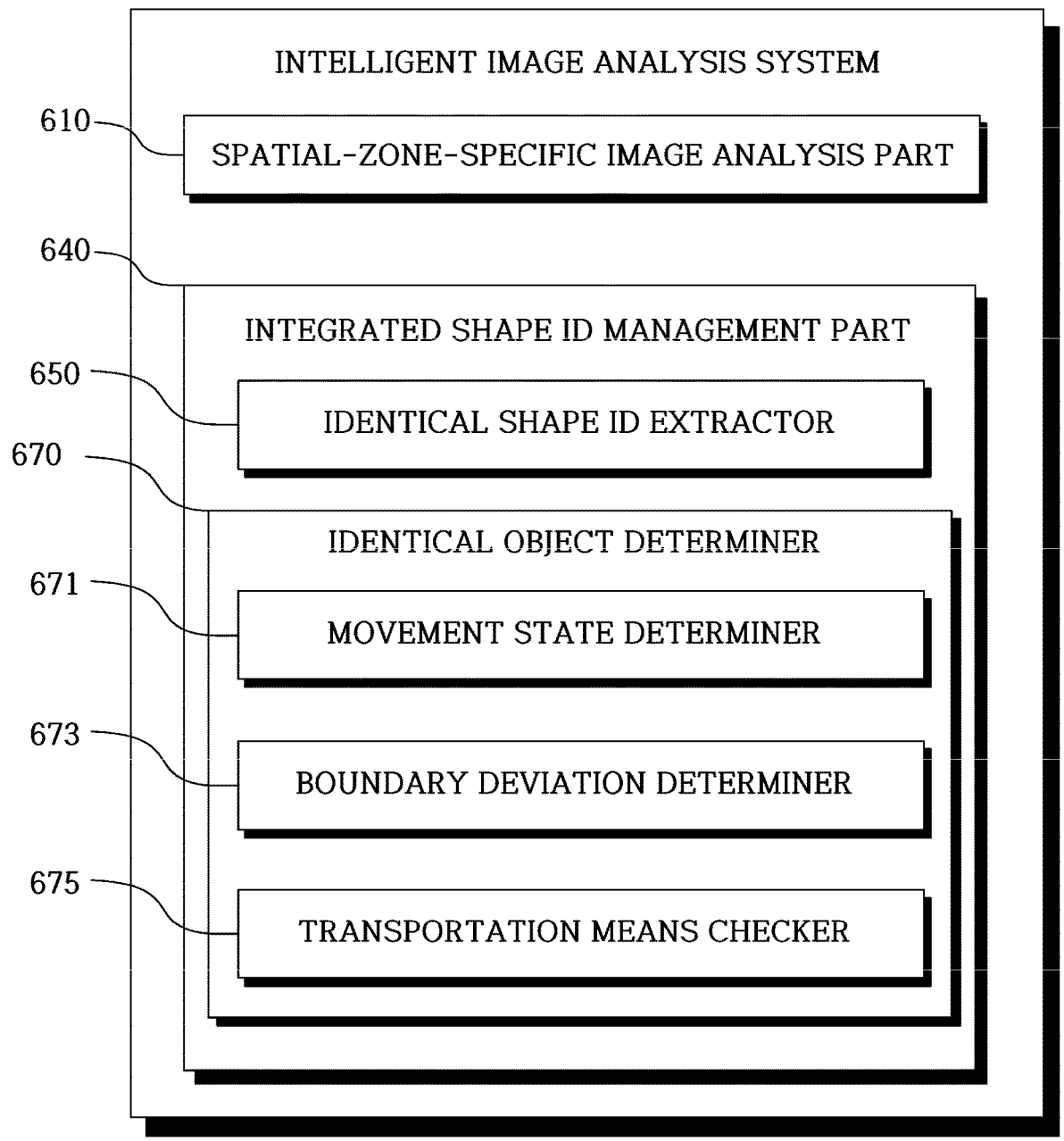
FIG. 6 is a detailed block diagram of an intelligent image analysis system for analyzing an object by intelligently processing camera images according to a modification of the exemplary embodiment of the present invention.

FIG. 6 is a detailed block diagram of an intelligent image analysis system for analyzing an object by intelligently processing camera images according to a modification of the exemplary embodiment of the present invention.

According to an additional aspect, an identical object determiner 670 includes a movement state determiner 671 that determines a movement speed and direction of an object using coordinates of the object having the same shape ID in the same spatial zone.

The identical object determiner 670 of the integrated shape ID management part 640 determines a shape ID related to the same object using the distance between identical shape IDs and imaging time information. In particular, the identical object determiner 670 includes the movement state determiner 671 and thus may determine whether an additional shape ID is the same object using a movement direction and speed of a shape ID which is determined to be the same object in the same spatial zone.

A movement speed and direction of the object of interest may be calculated using the first row 510 and the second row 520 of FIG. 5 determined to have the same object as the first row 510. The distance between the object of interest of the first row 510 and that of the second row 520 is sqrt[(500−100)$^2$+(400−200)$^2$ ]=447, and the time interval is one minute. Accordingly, the movement speed is 447/minute. The movement direction is a direction in which both the X coordinate and the Y coordinate increase and may be represented as arctan[200/400]=0.46 rad.

Likewise, a movement speed and direction of the object of interest between the fourth row 530 and the second row 520 of FIG. 5 can be calculated. According to the same method, the distance is sqrt[(900−500)$^2$+(600−400)$^2$ ]=447 which is the same as above, and thus the movement speed and direction also are the same as above. Therefore, the object of the fourth row 540 may be determined to be the object of interest.

According to an additional aspect, the identical object determiner 670 further includes a boundary deviation determiner 673 that determines whether an object deviates from the boundary of the spatial zone of a current camera using the movement direction and speed of the object.

The size of a spatial zone imaged by a camera may be represented as an X coordinate and a Y coordinate of a camera image. When an object arrives at the boundary of a spatial zone, the object may not be detected in a next image of the same spatial zone. In this case, it is necessary to detect the object in adjacent spatial zones. Accordingly, the boundary deviation determiner 673 may set a certain range from the boundary of the spatial zone as a boundary range and determine whether the object is within the boundary range. When the object belongs to the boundary range and then disappears, the object is determined to have deviated from the boundary, and it is necessary to detect the object in images of adjacent spatial zones.

For example, when the spatial zones of FIG. 3 have a size of 1000*800, an X coordinate boundary range and a Y coordinate boundary range may be set to 150 and 100, respectively. Since the X coordinate of the fourth row 530 of FIG. 5 is 900 which is larger than 1000−150=850, the object belongs to the boundary range. It is determined whether objects detected in an image of the camera A-02, an image of the camera B-01, and an image of the camera B-02, which are images of adjacent spatial zones corresponding to a subsequent time point, correspond to the same object.

Comparing the fifth row 547 with the fourth row 530 of FIG. 5, the distance between an object of the fifth row 547 and an object of the fourth row 530 is sqrt[((900+0)−900)$^2$-((1000+400)−600)$^2$ ]=800 in consideration of the locations of the camera origins, and the time interval is two minutes. Accordingly, the movement speed is 400/minute. In the movement direction, the Y coordinate increases, but the X coordinate does not change.

Comparing the sixth row 550 with the fourth row 530 of FIG. 5, the distance between an object of the sixth row 550 and an object of the fourth row 530 is sqrt[((1100+100)−900)²-((1000+200)−600)² ]=854 in consideration of the locations of the cameras, and the time interval is two minutes. Accordingly, the movement speed is 427/minute. In the movement direction, both the X coordinate and the Y coordinate increase.

Since the object of interest is not imaged at the same time point of 14:05 in spatial zones of cameras which do not overlap each other, a shape ID of the sixth row 550 having a similar movement speed and direction to the previous movement speed and direction may be determined to be the same object as the object of interest.

According to an additional aspect, the identical object determiner 670 includes a transportation means checker 675 that checks nearby transportation means when no object is detected in a spatial zone of a current camera.

An object of interest may use transportation, such as a subway, a bus, a taxi, or the like, in a spatial zone imaged by a camera. In this case, the object is not detected in the same spatial zone at a subsequent time point and may not be detected in adjacent spatial zones. The object of interest may disappear from a transportation station, such as a subway station, a bus stop, a taxi stand, or the like, in a spatial zone imaged by a camera and appear at a transport station in a spatial zone imaged by another camera. Therefore, transportation means used by the object of interest may be determined, and the shape ID of the object of interest may be detected in a spatial zone in which the object of interest may arrive after a lapse of time according to the average travel speed of the transportation means and that is imaged by another camera, to determine whether the objects of interest are identical.

The location of a transportation station, such as a subway station, a bus stop, a taxi stand, or the like, in a spatial zone imaged by a camera may be stored in a database in advance and managed by a transportation manager (not shown). When an object disappears from the spatial zone, the transportation means checker 675 may compare the location of disappearance with the location of the transportation station to determine the transportation means used by the object.

When an object disappears from the transportation station, that is, when the shape ID of the object is no longer detected in the spatial zone, other spatial zones including transportation stations are searched for the same shape ID. Among the other spatial zones, a spatial zone may be selected in which the shape ID is detected within a time range in which the object may arrive in the spatial zone in consideration of the average speed of the transportation means and the distance between transportation stations. Meanwhile, a transportation means of which a shape may be identified, such as a bus or a taxi, may be tracked through a transportation means route tracer (not shown) until the object gets off.

Figure 7:
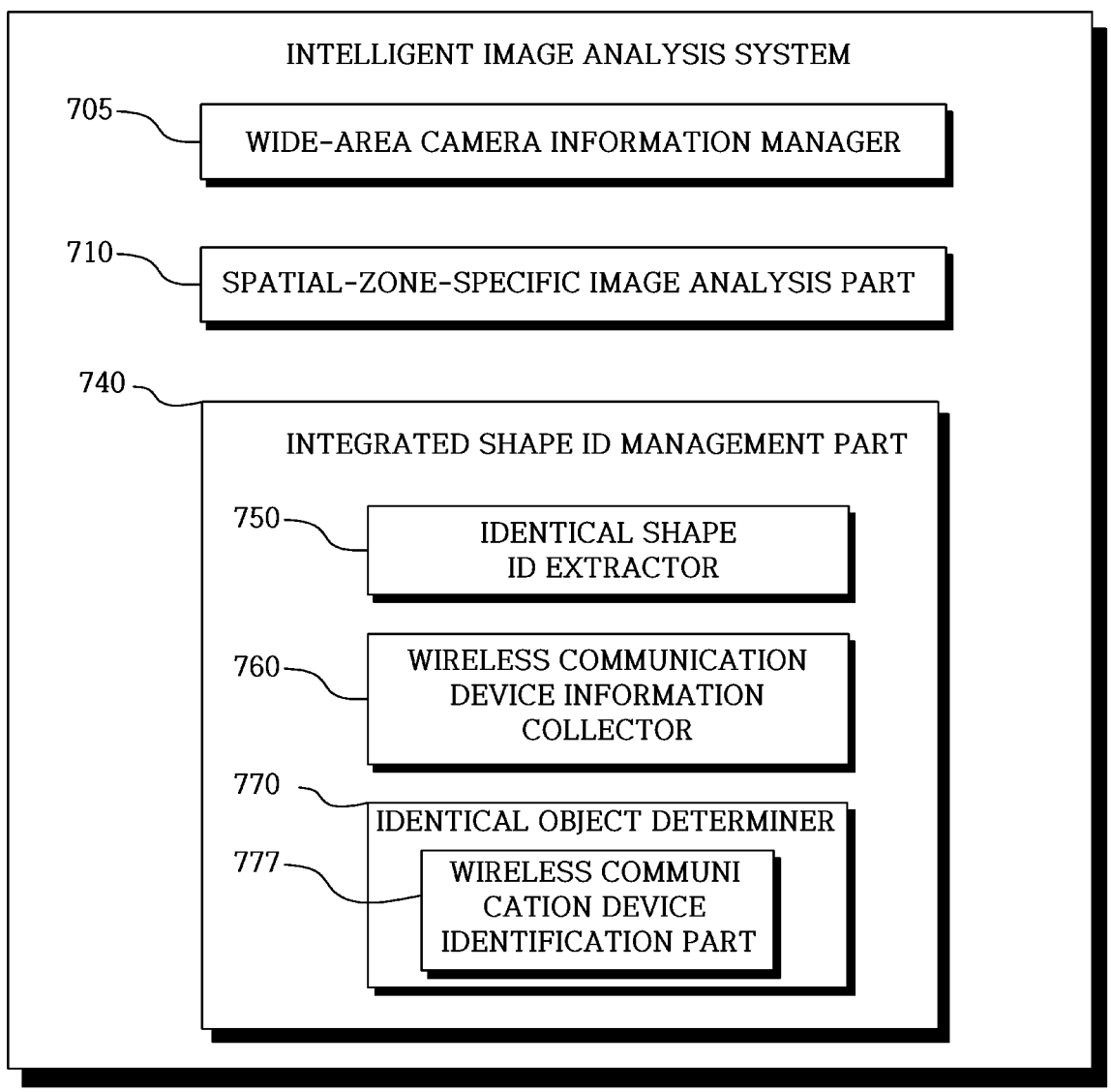
FIG. 7 is a detailed block diagram of an intelligent image analysis system for analyzing an object by intelligently processing camera images according to another modification of the exemplary embodiment of the present invention.

FIG. 7 is a detailed block diagram of an intelligent image analysis system for analyzing an object by intelligently processing camera images according to another modification of the exemplary embodiment of the present invention.

According to an additional aspect, the intelligent image analysis system further includes a wireless communication device information collector 760 and a wireless communication device identification part 777. The wireless communication device information collector 760 collects ID information of wireless communication devices carried by objects. The wireless communication device identification part 777 determines a spatial zone in which the same wireless communication device is present.

A wireless communication device carried by an object of interest may be a terminal employing protocols such as WiFi, ZigBee, Bluetooth, and the like, as well as a mobile communication terminal of Long Term Evolution (LTE), fifth generation (5G), and the like. The wireless communication device information collector 760 may collect wireless communication device information through a mobile communication base station, a wireless local area network (WLAN), or an Internet of things (IoT) access point (AP). Referring to the first row of FIG. 5, wireless communication device information (a wireless ID) of the object of interest collected by the wireless communication device information collector 760 is stored as "H01A."

Referring to FIG. 5, the wireless communication device identification part 777 may determine the first row 510, the second row 520, the fourth row 530, and the sixth row 550 including "H01A" as the wireless communication device information (the wireless ID) of the object of interest to correspond to the object of interest. In other words, the object of interest can be rapidly selected using shape IDs and wireless communication device information.

According to an additional aspect, the intelligent image analysis system further includes a wide-area camera information manager 705. The wide-area camera information manager 705 manages information on each spatial zone in a wide zone including a plurality of spatial zones and camera ID information of each spatial zone.

The size of an area from which wireless communication device information is collected changes according to a wireless communication protocol. In the case of Bluetooth, the location of a wireless communication device may be specified within a small range. On the other hand, mobile communication corresponds to a wide zone in which a cell for communication with a base station has a much larger size than a spatial zone imaged by a camera. Information on spatial zones in the wide zone and camera ID information may be stored in a database and managed by the wide-area camera information manager 705. Referring to FIG. 3, spatial zones imaged by the cameras A-01 and A-02 correspond to a wide zone A, spatial zones imaged by the cameras B-01 and B-02 correspond to a wide zone B, and spatial zones imaged by the cameras C-01 and C-02 correspond to a wide zone C.

According to an additional aspect, the wide zone corresponds to a cell area in which a base station of a mobile communication network may communicate with a terminal, and the wireless communication device may be a mobile communication terminal that communicates with the base station of the wide zone.

Figure 8:
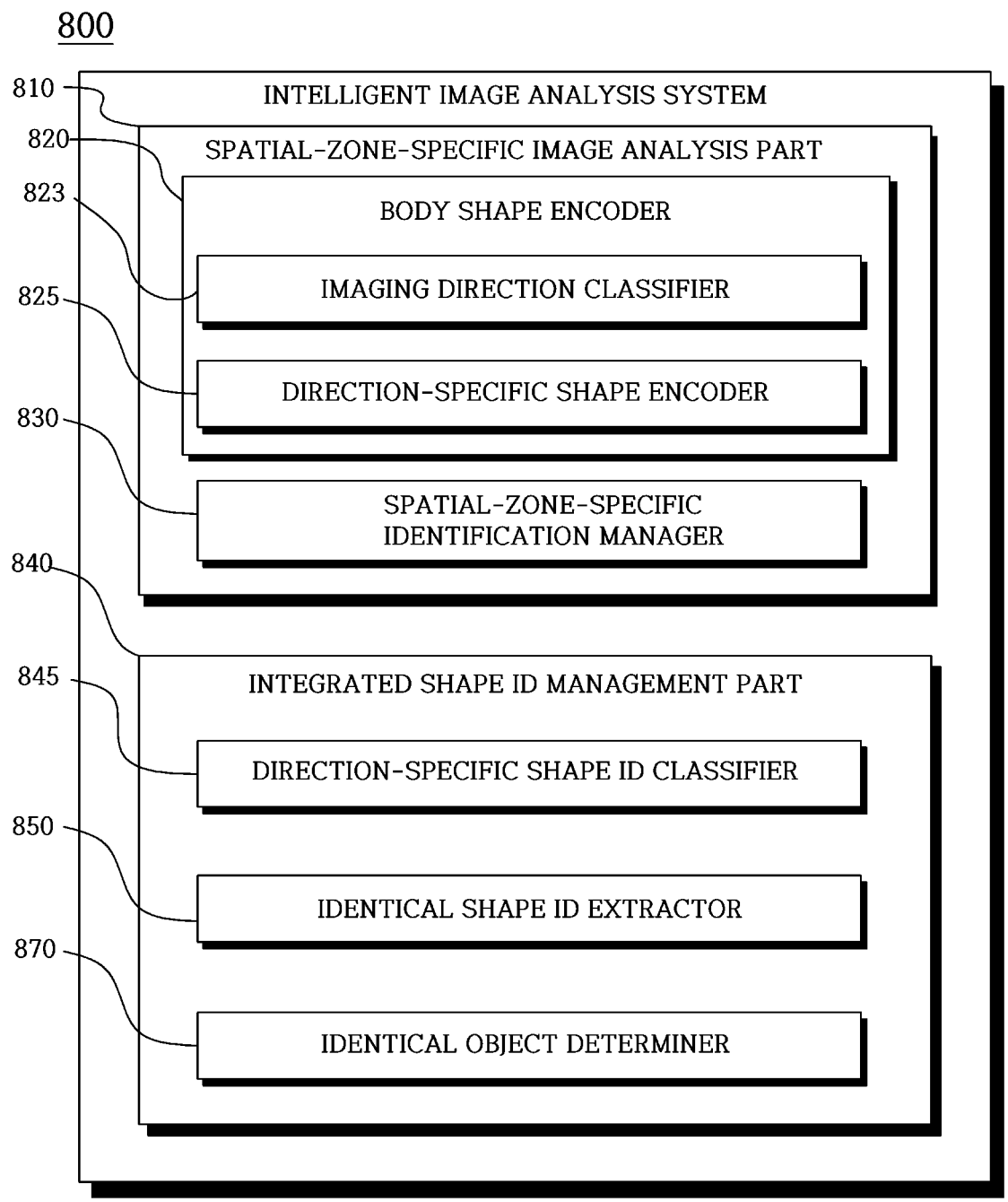
FIG. 8 is a detailed block diagram of an intelligent image analysis system for analyzing an object by intelligently processing camera images according to still another modification of the exemplary embodiment of the present invention.

FIG. 8 is a detailed block diagram of an intelligent image analysis system for analyzing an object by intelligently processing camera images according to still another modification of the exemplary embodiment of the present invention.

According to an additional aspect, a body shape encoder 820 includes an imaging direction classifier 823 and a plurality of direction-specific shape encoders 825. The imaging direction classifier 823 detects an object in a captured image and classifies the object according to an imaging direction. The direction-specific shape encoders 825 determine imaging-direction-specific shape IDs of the object.

FIG. 3 shows a case in which one camera is installed in each spatial zone, but a plurality of cameras may be installed to image one spatial zone, or some cameras may be installed to simultaneously image a plurality of spatial zones. When a plurality of cameras are installed for imaged spatial zones to overlap, the same object of interest is imaged in different directions. Since images captured by the plurality of cameras have different imaging angles, the body shape encoder 820 of a spatial-zone-specific image analysis part 810 may encode the same object of interest into different shape IDs. Therefore, it is necessary to perform shape encoding in consideration of an imaging direction.

The imaging direction classifier 823 classifies imaging directions of an object detected in captured images according to camera locations in a spatial zone. The direction-specific shape encoders 825 encode the detected object into shape IDs according to the imaging direction.

According to an additional aspect, an integrated shape ID management part 840 further includes a direction-specific shape ID classifier 845. The direction-specific shape ID classifier 845 classifies, as identical shape IDs, shape IDs of objects detected at the same location in direction-specific images captured at the same time point.

The objects detected at the same time point at the same location by the plurality of cameras are identical to each other. Accordingly, even when the objects are encoded into different shape IDs according to imaging directions, the objects correspond to the same object. Therefore, the direction-specific shape ID classifier 845 classifies the different direction-specific shape IDs detected at the same location at the same time point as a shape ID of the same object.

Figure 9:
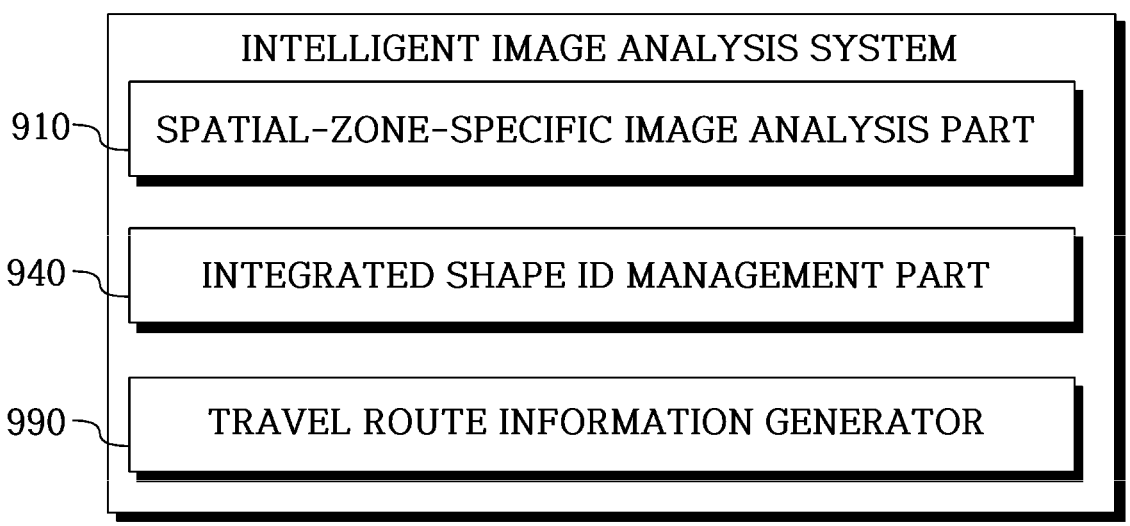
FIG. 9 is a detailed block diagram of an intelligent image analysis system for analyzing an object by intelligently processing camera images according to yet another modification of the exemplary embodiment of the present invention.

FIG. 9 is a detailed block diagram of an intelligent image analysis system for analyzing an object by intelligently processing camera images according to yet another modification of the exemplary embodiment of the present invention.

According to an additional aspect, the intelligent image analysis system further includes a travel route information generator. The travel route information generator generates travel route information of an object using time-series location information of a shape ID related to the same object.

A processor of the intelligent image analysis system extracts shape ID information of objects having the same shape ID as an object of interest from a plurality of spatial zones, arranges the same shape ID data in order of imaging time, calculates a movement speed and direction between the objects having the same shape ID, and determines an object having a similar movement speed and direction to a movement speed and direction of a previous time point among objects in different spatial zones at the same time point to be the same object as the object of interest. The processor may generate travel route information using time-series location information of the shape ID determined to be the same object. The generated travel route information may be visually provided through an output device.

Intelligent image analysis methods for the intelligent image analysis system to analyze an object by intelligently processing camera images will be described with reference to FIGS. 10 to 13.

Figure 10:
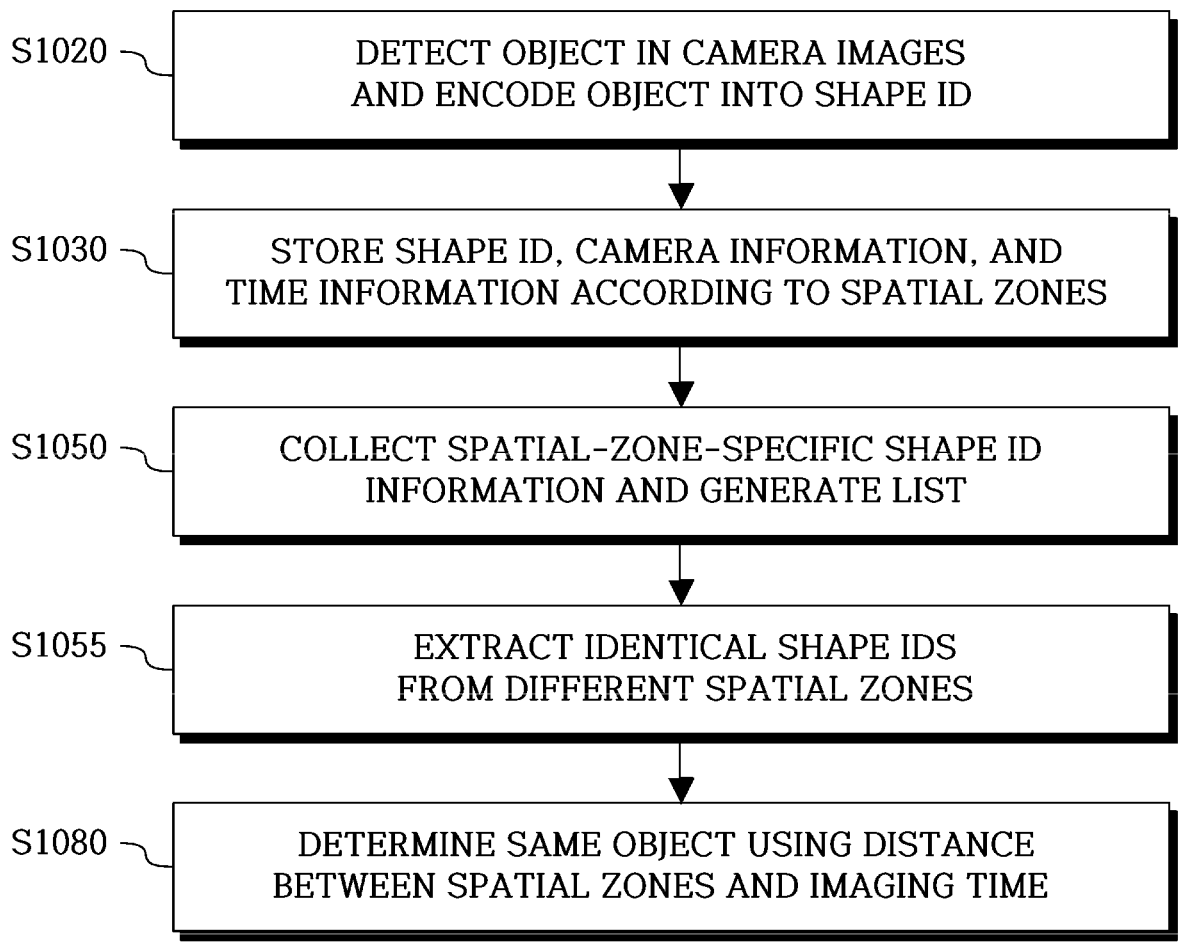
FIG. 10 is a flowchart illustrating a method in which an intelligent image analysis system analyzes an object by intelligently processing camera images according to an exemplary embodiment of the present invention.

FIG. 10 is a flowchart illustrating a method in which an intelligent image analysis system analyzes an object by intelligently processing camera images according to an exemplary embodiment of the present invention.

The intelligent image analysis system receives captured images from cameras. The received images may be stored in a storage device such as a memory or the like. The images of spatial zones captured by the cameras are selected at appropriate frame intervals, and objects are detected in the selected camera images. Each of the detected objects is encoded into a shape ID by a shape encoder (S1020).

To manage the encoded shape ID information, shape IDs, camera information (camera Nos.), and time information (imaging times) are stored and managed according to spatial zones (S1030). Coordinates of objects in spatial zones may be stored together with the shape IDs of the objects. Location information of the cameras may be stored and managed in a data table.

A list is generated by collecting the stored spatial-zone-specific shape ID information (S1050). Identical shape IDs are extracted from a plurality of lists for different spatial zones (S1055). The extracted shape ID information is arranged chronologically.

It is determined whether the identical shape IDs correspond to the same object using the distance between spatial zones and imaging time (S1080). When no transportation means is used, an identical shape ID detected in a non-adjacent spatial zone is determined not to be the same object.

Figure 11:
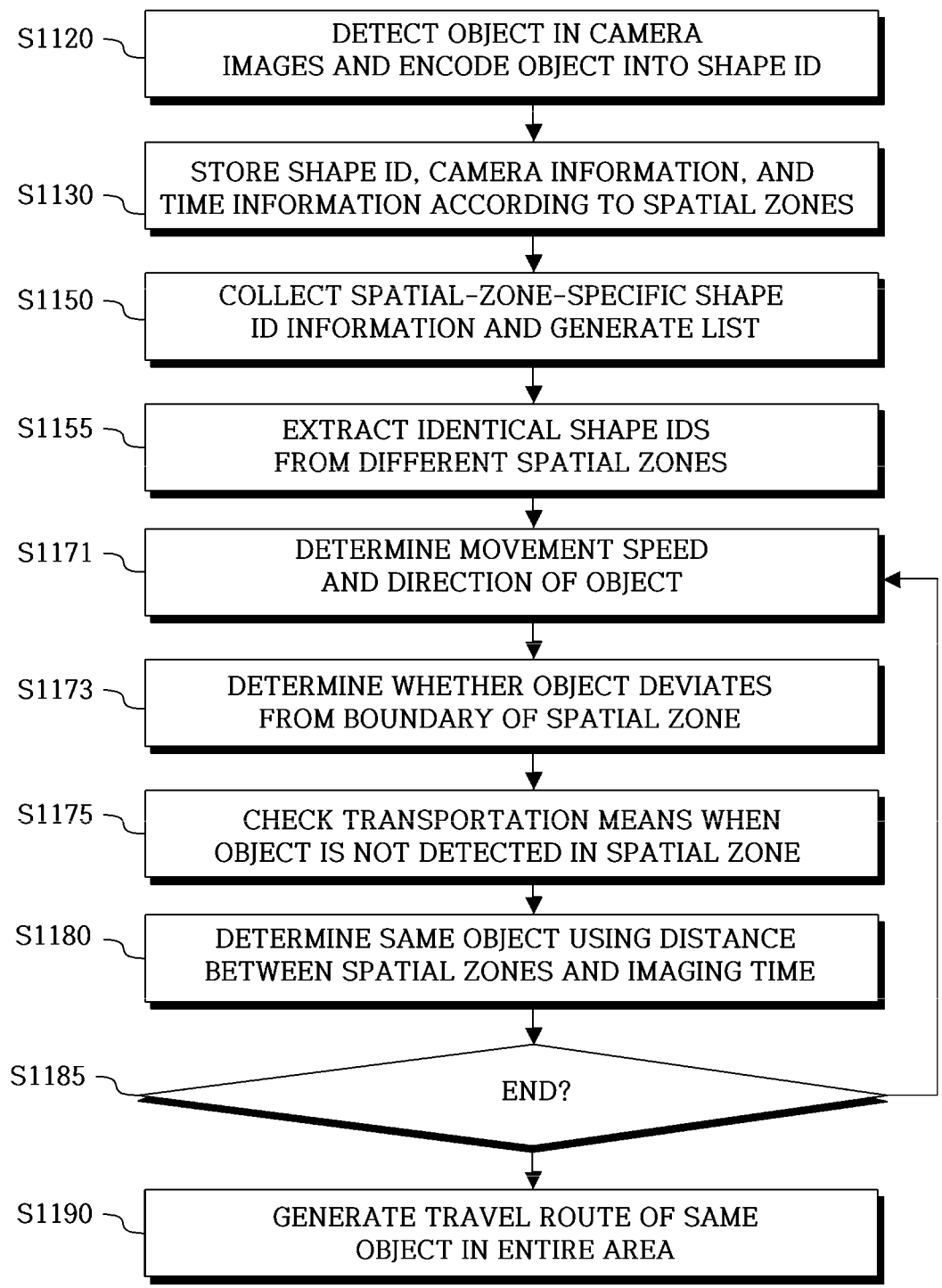
FIG. 11 is a flowchart illustrating a method in which an intelligent image analysis system analyzes an object by intelligently processing camera images according to a modification of the exemplary embodiment of the present invention.
Figure 12:
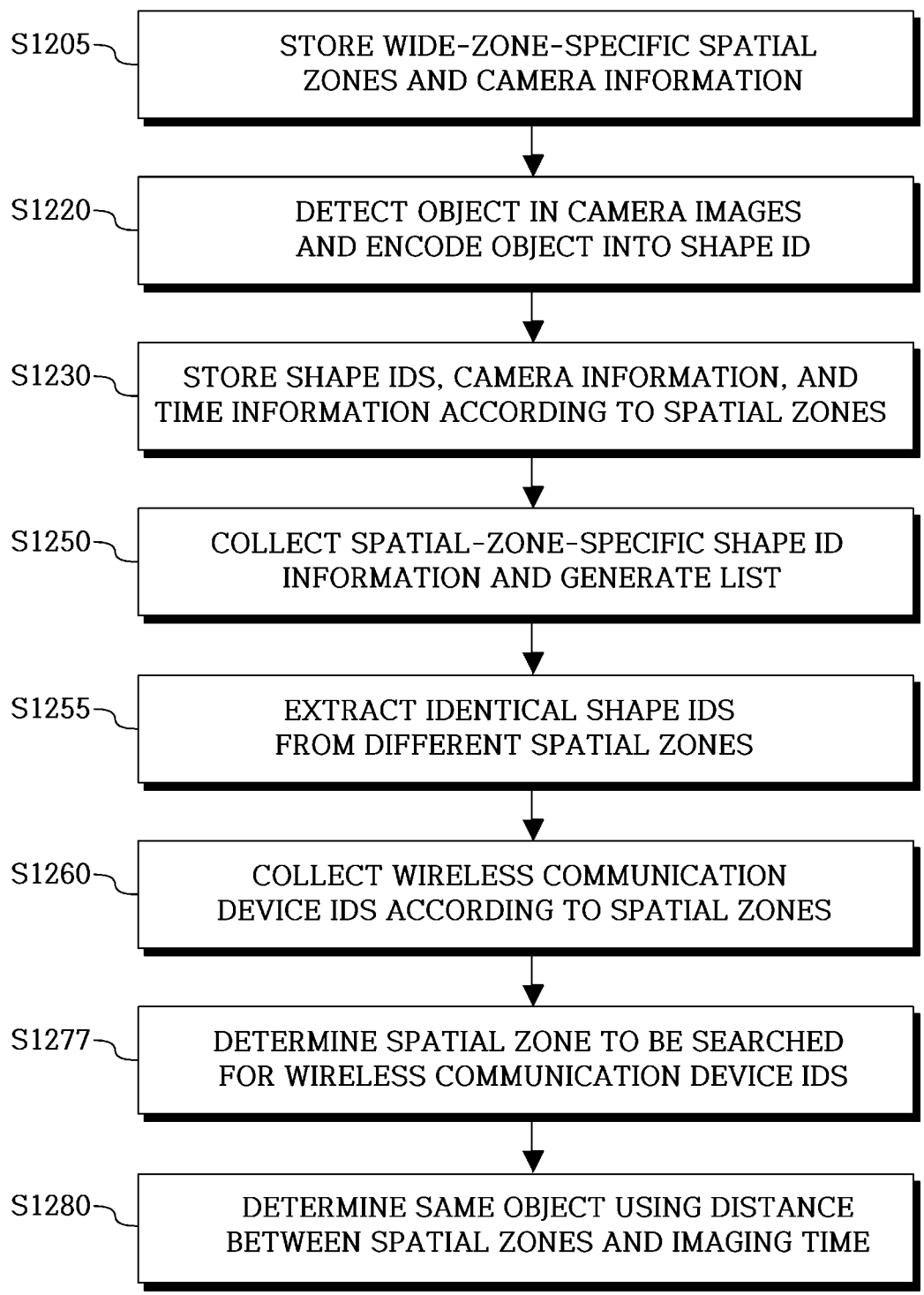
FIG. 12 is a flowchart illustrating a method in which an intelligent image analysis system analyzes an object by intelligently processing camera images according to another modification of the exemplary embodiment of the present invention.
Figure 13:
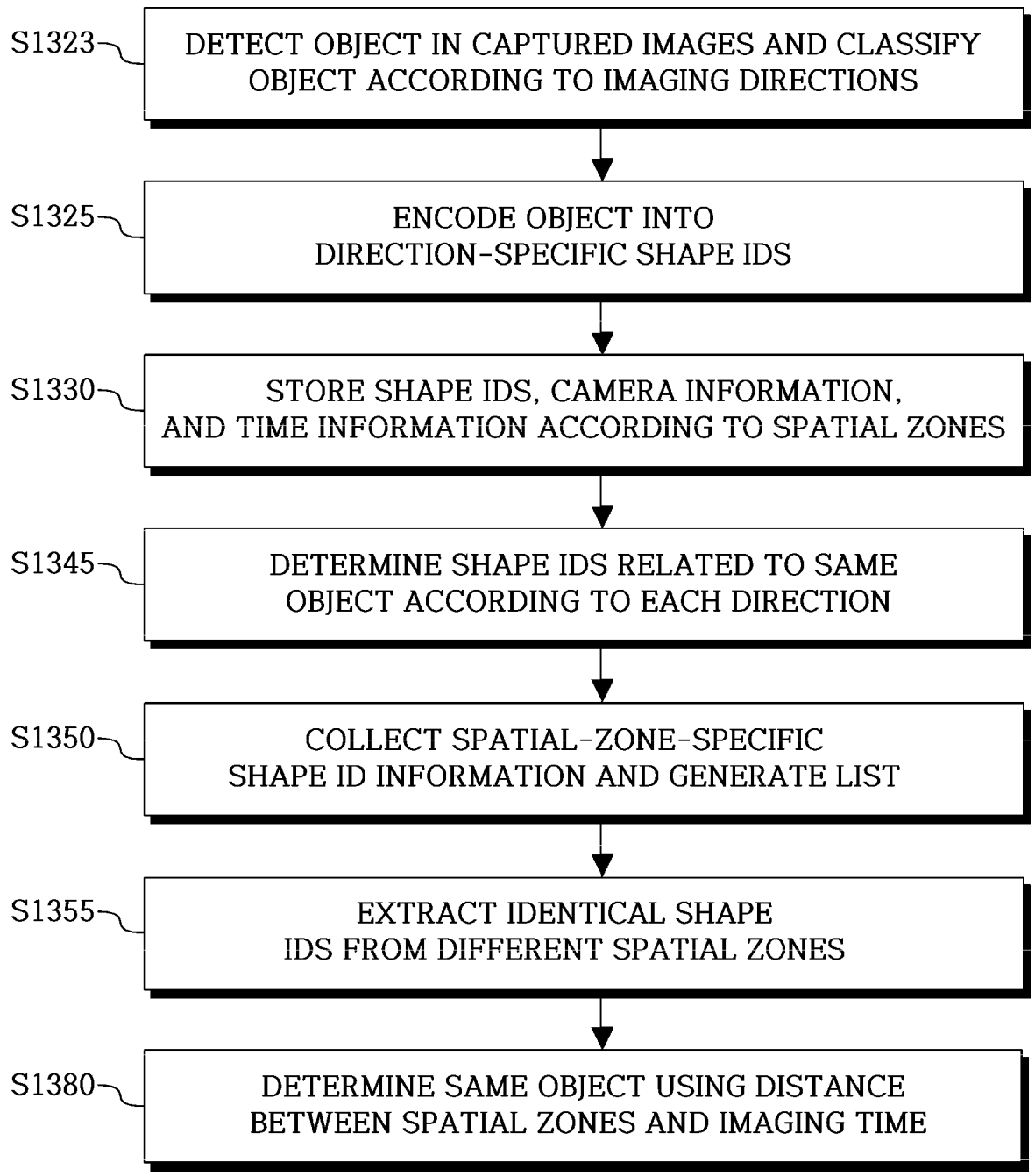
FIG. 13 is a flowchart illustrating a method in which an intelligent image analysis system analyzes an object by intelligently processing camera images according to still another modification of the exemplary embodiment of the present invention.

FIGS. 11 to 13 illustrate various modifications of the intelligent image analysis method according to the embodiment of FIG. 10. The modifications may be individually added to the embodiment, or the plurality of modifications may be added to the embodiment all together. To avoid repetition, elements of the above-described embodiment will not be described.

FIG. 11 is a flowchart illustrating a method in which an intelligent image analysis system analyzes an object by intelligently processing camera images according to a modification of the exemplary embodiment of the present invention.

Identical shape IDs are extracted from a plurality of lists for different spatial zones (S1155), and the extracted shape ID information is arranged chronologically.

A movement speed and direction of an object are determined for the same shape ID detected at a subsequent time point (S1171). The movement speed of the object may be calculated by dividing the distance between two objects, which is calculated from coordinates of the two objects, by a time. When the identical shape IDs are simultaneously detected at different locations, an object having a similar movement speed and direction to a previous movement speed and direction may be determined to be the same object.

It is determined whether the object deviates from the boundary of a spatial zone (S1173). When the object is within a boundary range of the spatial zone, the object may not be detected in the spatial region and may disappear at a subsequent time point. In this case, the object may be determined to have deviated from the boundary. When the object deviates from the boundary of the spatial zone, the same shape ID detected in an adjacent spatial zone may be determined to be the same object. When the same shape ID is detected in a plurality of adjacent spatial zones at a subsequent time point, the same object may be determined in consideration of a previous movement speed and direction of the object (S1180).

When the object is not detected in the spatial zone, transportation means are checked (S1175). When the object disappears after arriving near a transportation station, a type of transportation means is checked. The same object is determined from among the identical shape IDs in consideration of a movement speed according to the type of transportation means (S1180).

The above process is repeated for the identical shape ID information (S1185), and travel route information of the same object in the entire area is generated using time-series location information of the same object (S1190).

FIG. 12 is a flowchart illustrating a method in which an intelligent image analysis system analyzes an object by intelligently processing camera images according to another modification of the exemplary embodiment of the present invention.

Wide-zone-specific spatial zones and camera information may be stored in a database in advance and managed (S1205). A cell area in which a signal of a base station is received may be set as a wide zone.

Identical shape IDs are extracted from a plurality of lists of different spatial zones (S1155), and the extracted shape ID information is arranged chronologically.

IDs of wireless communication devices are collected from each spatial zone (S1260), and a spatial zone to be searched for a wireless communication device is determined (S1277). When the wireless communication device ID of an object of interest is known, the same object is selected from among IDs found in spatial zones belonging to a wide zone including the ID of the wireless communication device.

FIG. 13 is a flowchart illustrating a method in which an intelligent image analysis system analyzes an object by intelligently processing camera images according to still another modification of the exemplary embodiment of the present invention.

When a plurality of cameras are installed for imaged spatial zones to at least partially overlap, an object in an overlapping area may be imaged at different angles by the plurality of cameras. The object is detected in each of images of the object at the same location that are simultaneously captured at the different angles by the plurality of cameras. The detected objects are classified according to imaging directions (S1323), and the objects are encoded into shape IDs according to the imaging directions (S1325).

The shape IDs, camera information, and time information are stored and managed according to spatial zones (S1330). Here, information on imaging directions is stored together.

Shape IDs related to the same object are determined according to each direction (S1345). When objects are detected at the same location at the same time point, the objects correspond to the same object despite different direction-specific shape IDs. Accordingly, all the direction-specific shape IDs are selected as shape IDs of the same object.

According to the present invention, it is possible to provide an intelligent image analysis system for rapidly re-recognizing an object of interest from a plurality of camera images using a list of shape IDs which are encoded according to each spatial zone.

In addition, the proposed intelligent image analysis system of the present invention can accurately trace a travel route of an object of interest by tracking movement of the object of interest and a signal of a wireless communication device.

Although exemplary embodiments of the present invention have been described above with reference to the accompanying drawings, the present invention is not limited to the exemplary embodiments and should be construed as encompassing various modifications which can be clearly derived from the exemplary embodiments by those of ordinary skill in the art. The claims are intended to cover such modifications.

What is claimed is:

1. An intelligent image analysis system for analyzing an object by intelligently processing camera images of a plurality of spatial zones in each of which at least one camera is installed, the intelligent image analysis system comprising:
    a spatial-zone-specific image analysis part comprising body shape encoders configured to detect an object in a camera image of each spatial zone and encode the object into a shape identifier (ID) on the basis of features of a body shape and a spatial-zone-specific identification manager configured to manage the shape ID together with camera information and time information; and
    an integrated shape ID management part comprising an identical shape ID extractor configured to extract identical shape IDs from different spatial zones on the basis of a list of shape IDs which are collected from each of the spatial-zone-specific body shape encoders and encoded according to each spatial zone, and an identical object determiner configured to determine a shape ID related to the same object using a distance between two spatial zones and imaging time information.

2. The intelligent image analysis system of claim 1, wherein the identical object determiner comprises a movement state determiner configured to determine a movement speed and direction of the object using coordinates of the object having the same shape ID in the same spatial zone.

3. The intelligent image analysis system of claim 2, wherein the identical object determiner further comprises a boundary deviation determiner configured to determine whether the object deviates from a boundary of a spatial zone of a current camera using the movement direction and speed of the object.

4. The intelligent image analysis system of claim 1, wherein the identical object determiner comprises a transportation means checker configured to check nearby transportation means when the object is not detected in a spatial zone of a current camera.

5. The intelligent image analysis system of claim 1, further comprising:
    a wireless communication device information collector configured to collect ID information of a wireless communication device carried by the object; and
    a wireless communication device identification part configured to determine a spatial zone in which a wireless communication device ID identical to the ID information is present.

6. The intelligent image analysis system of claim 5, further comprising a wide-area camera information manager configured to manage information on each spatial zone in a wide zone including a plurality of spatial zones and camera ID information of each spatial zone.

7. The intelligent image analysis system of claim 6, wherein the wide zone corresponds to a cell area in which a base station of a mobile communication network communicates with a terminal, and
    the wireless communication device is a mobile communication terminal which communicates with the base station of the wide zone.

8. The intelligent image analysis system of claim 1, wherein each of the body shape encoders comprises:
    an imaging direction classifier configured to detect the object in a captured image and classify the object according to imaging directions; and
    a plurality of direction-specific shape encoders configured to determine shape IDs for the object according to the imaging directions.

9. The intelligent image analysis system of claim 8, wherein the integrated ID management part comprises a direction-specific shape ID classifier configured to classify, as identical shape IDs, shape IDs of objects detected at the same location in direction-specific images captured at the same time point.

10. The intelligent image analysis system of claim 1, further comprising a travel route information generator configured to generate travel route information of the object using time-series location information of the shape ID related to the same object.

\* \* \* \* \*